United States Patent
Iwamatsu (10) Patent No.: US 9,554,011 B2
(45) Date of Patent: Jan. 24, 2017

(54) LIGHT IRRADIATOR, IMAGE READER AND IMAGE FORMING APPARATUS

(71) Applicant: Akihiro Iwamatsu, Kanagawa (JP)

(72) Inventor: Akihiro Iwamatsu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/922,614

(22) Filed: Oct. 26, 2015

(65) Prior Publication Data

US 2016/0134775 A1  May 12, 2016

(30) Foreign Application Priority Data

Nov. 11, 2014  (JP) .................................. 2014-228607

(51) Int. Cl.
| | |
|---|---|
| H04N 1/04 | (2006.01) |
| H04N 1/028 | (2006.01) |
| F21V 8/00 | (2006.01) |
| H04N 1/00 | (2006.01) |
| G02B 27/09 | (2006.01) |

(52) U.S. Cl.
CPC .......... *H04N 1/0289* (2013.01); *G02B 6/0016* (2013.01); *G02B 6/0043* (2013.01); *G02B 6/0046* (2013.01); *G02B 27/0994* (2013.01); *H04N 1/00795* (2013.01)

(58) Field of Classification Search
CPC ............................ H04N 1/0289; G02B 6/0016
USPC ........................................ 358/475, 484, 509
See application file for complete search history.

(56) References Cited

U.S. PATENT DOCUMENTS

| | | | | |
|---|---|---|---|---|
| 7,760,403 | B2* | 7/2010 | Sakurai ................ | G02B 6/0046 358/475 |
| 8,515,313 | B2* | 8/2013 | Suto .................... | G03G 15/0409 399/220 |
| 8,928,955 | B2* | 1/2015 | Minamikawa ..... | H04N 1/02815 358/475 |
| 8,982,431 | B2* | 3/2015 | Mitsutake ............ | G02B 6/0091 358/475 |

(Continued)

FOREIGN PATENT DOCUMENTS

| | | |
|---|---|---|
| JP | 2006-067551 | 3/2006 |
| JP | 2012-138781 | 7/2012 |

(Continued)

*Primary Examiner* — Cheukfan Lee
(74) *Attorney, Agent, or Firm* — Oblon, McClelland, Maier & Neustadt, L.L.P.

(57) ABSTRACT

A light irradiator includes a light source and a light guide to guide a light flux from the light source to an illumination area. The light guide has an incident surface, an emission surface and two side surfaces. The emission surface is located apart from a reading optical axis with an inclination relative to the reading optical axis. The following relations are satisfied:

$$S1(x) \geq S2(x)$$

$$S1(L) > S2(L)$$

wherein S1 represents a divided cross-sectional area near the reading optical axis and S2 represents a divided cross-sectional area far from the reading optical axis when a virtual cross-sectional area S parallel to the incident surface of the light guide is divided by a plane passing the center of the incident surface, formed by a direction perpendicular thereto and the incident surface and the main scanning direction; S (x) represents a virtual cross-sectional area (Continued)

distant from the incident surface of the light guide by x; L is a distance from the incident surface to the emission surface; and $0 \leq x < L$.

10 Claims, 9 Drawing Sheets

(56) References Cited

U.S. PATENT DOCUMENTS

| | | | | |
|---|---|---|---|---|
| 2006/0008295 A1* | 1/2006 | Kohchi | ................ | H04N 1/028 399/144 |
| 2009/0316224 A1* | 12/2009 | Kawamura | ........ | H04N 1/02815 358/474 |
| 2009/0316225 A1* | 12/2009 | Fujioka | ................ | H04N 1/0284 358/474 |
| 2010/0129116 A1* | 5/2010 | Shinkawa | ........ | G03G 15/04036 399/200 |
| 2010/0232834 A1* | 9/2010 | Ishida | ................ | H04N 1/02815 399/144 |
| 2010/0315691 A1* | 12/2010 | Nishio | ................ | G03G 15/607 358/475 |
| 2011/0085214 A1* | 4/2011 | Shinkawa | .......... | H04N 1/00002 358/475 |
| 2011/0228353 A1* | 9/2011 | Okamoto | ........... | H04N 1/02815 358/475 |
| 2012/0300271 A1 | 11/2012 | Ishida | | |
| 2013/0141766 A1 | 6/2013 | Iwamatsu et al. | | |
| 2013/0222865 A1 | 8/2013 | Iwamatsu et al. | | |
| 2014/0233077 A1 | 8/2014 | Iwamatsu et al. | | |
| 2014/0268254 A1 | 9/2014 | Iwamatsu et al. | | |
| 2015/0062668 A1 | 3/2015 | Iwamatsu et al. | | |

FOREIGN PATENT DOCUMENTS

| | | |
|---|---|---|
| JP | 2012-249092 | 12/2012 |
| JP | 2012-257143 | 12/2012 |

* cited by examiner

LIGHT IRRADIATOR, IMAGE READER AND IMAGE FORMING APPARATUS

CROSS-REFERENCE TO RELATED APPLICATIONS

This patent application is based on and claims priority pursuant to 35 U.S.C. §119 to Japanese Patent Application No. 2014-228607, filed on Nov. 11, 2014, in the Japan Patent Office, the entire disclosure of which is hereby incorporated by reference herein.

BACKGROUND

Technical Field

The present invention relates to a light irradiator, an image reader and an image forming apparatus.

Description of the Related Art

Conventionally, an image reader such as scanners is equipped with a light irradiator irradiating light to a document surface to be read, located on a contact glass. The reading light irradiated by the light irradiator is reflected on the document surface and passes along an optical axis through a lens to form an image on an image reader such as a CCD based on the read document image.

As a light source for the light irradiator, e.g., a light emitting diode (LED) is used. Although having various good properties, the LED has insufficient absolute brightness of each of elements, such that it has been used for low-speed readers or compact equipment. Due to the recent progress in LED technologies, LED having higher brightness has been introduced which can be installed in a high-speed scanner requiring high document surface illuminance.

SUMMARY

A light irradiator including a light source; and a light guide to guide a light flux from the light source to an illumination area, wherein the illumination area has a length and a width, the light guide has a long shape in the main scanning direction and has almost the same cross-sectional shape in the main scanning direction, and has an incident surface almost confronting a light emitting surface of the light source, an emission surface opposite to the incident surface to emit light to the illumination area, and two side surfaces reflecting light from the incident surface to the emission surface, the emission surface is located apart from a reading optical axis perpendicular to a reading position of the document surface with an inclination relative to the reading optical axis, and the following relations are satisfied:

$$S1(x) \geq S2(x)$$

$$S1(L) > S2(L)$$

wherein S1 represents a divided cross-sectional area near the reading optical axis and S2 represents a divided cross-sectional area far from the reading optical axis when a virtual cross-sectional area S parallel to the incident surface of the light guide is divided by a plane passing the center of the incident surface, formed by a direction perpendicular thereto and the incident surface and the main scanning direction; S (x) represents a virtual cross-sectional area distant from the incident surface of the light guide by x; L is a distance from the incident surface to the emission surface; $0 \leq x < L$; and each of x and L is a distance in a direction perpendicular to the incident surface.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Exemplary embodiments of the present invention are described in detail below with reference to accompanying drawings. In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

According to some embodiments of the present invention, a light irradiator having high light use efficiency without causing deterioration of a captured image is provided.

The light irradiator of an embodiment of the present invention includes a light source and a light guide that guides a light flux from the light source to an illumination area, and is installed in e.g., an image reader capable of scanning a document surface to obtain an image. The illumination area has a length and a width that can sufficiently read a document surface. The light source is implemented by a plurality of light emitting elements (such as LED) arranged in a main scanning direction, or a long light emitting body (such as xenon lamps and LED illuminations for licensor) in the main scanning direction, when a longitudinal direction of the illumination area is the main scanning direction and a width direction of the illumination area is the sub-scanning direction.

Figure 1:
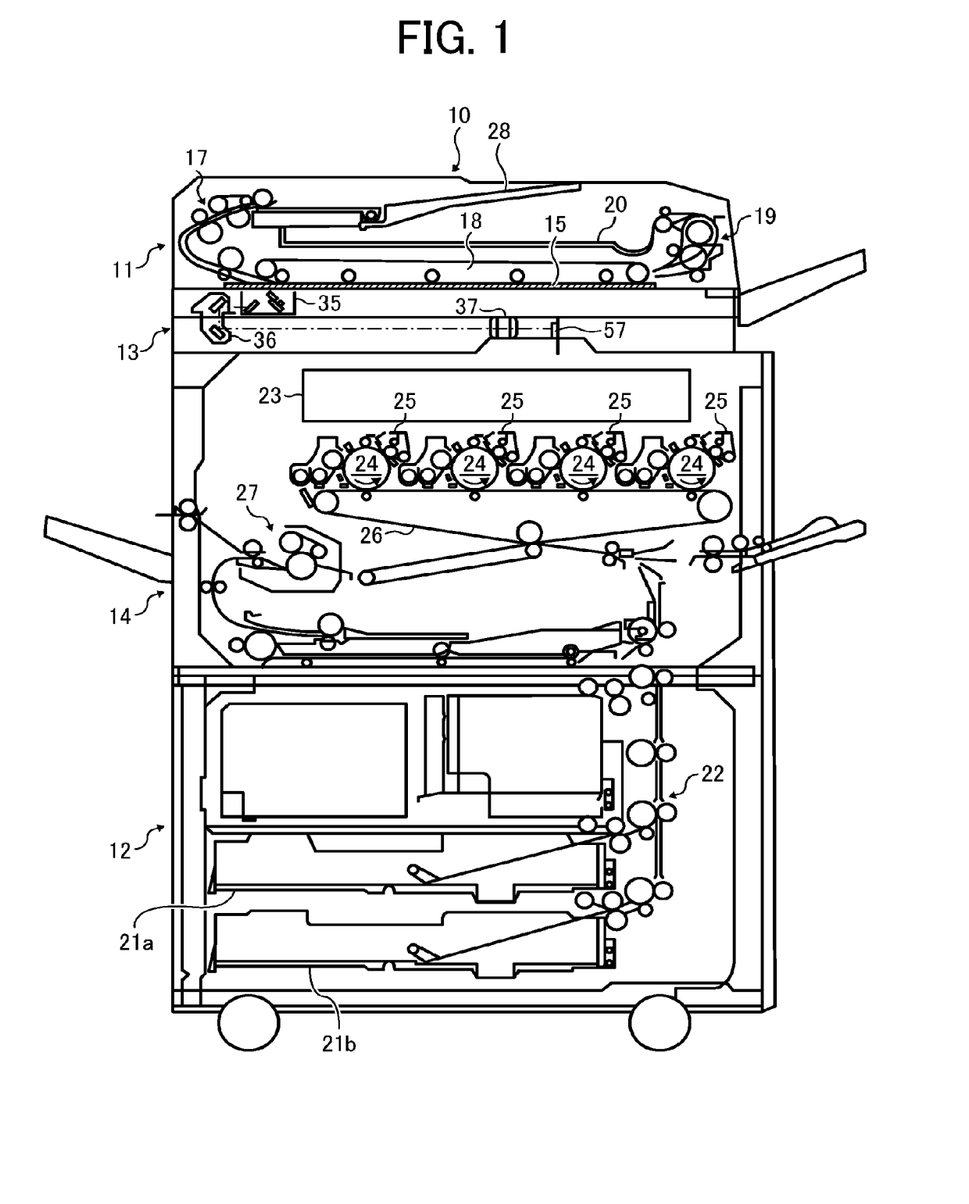
FIG. 1 is a cross-sectional view illustrating an embodiment of the image forming apparatus of the present invention.
Figure 2:
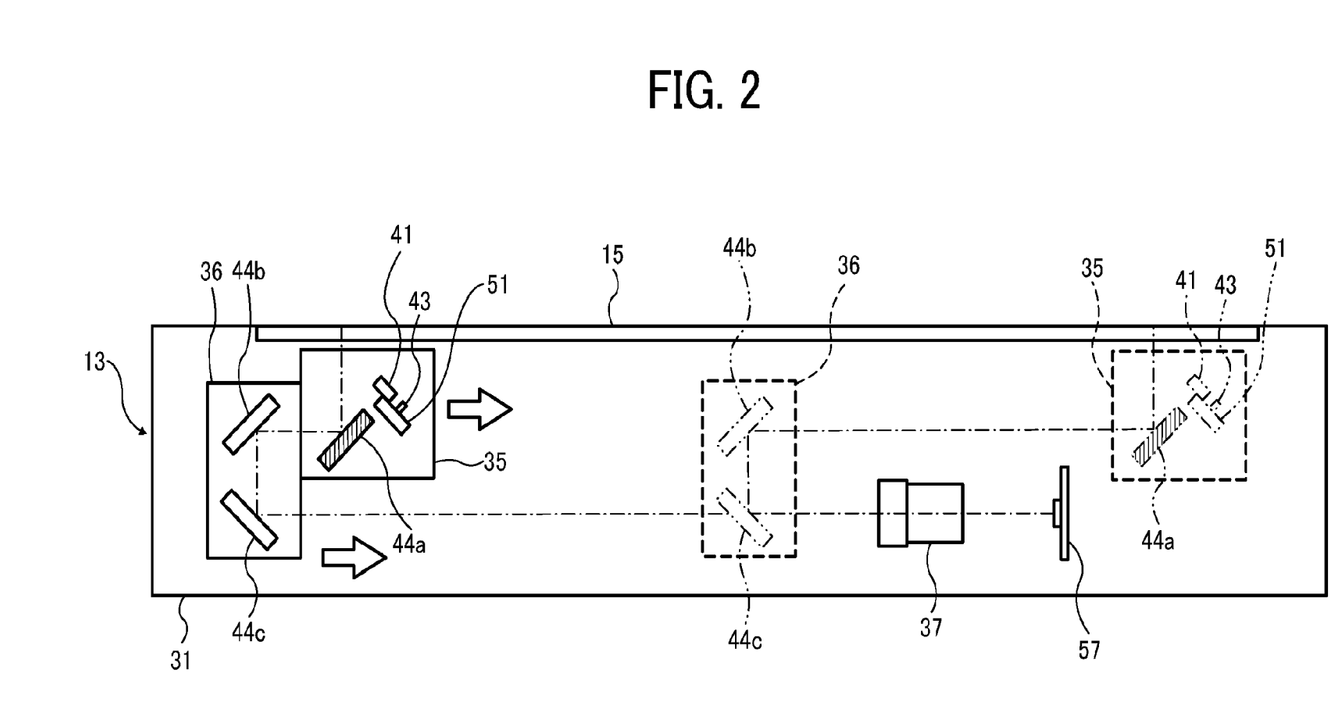
FIG. 2 is a cross-sectional view illustrating an embodiment of the image reader of the present invention.

An embodiment of the image reader is shown in FIG. 2 and an embodiment of the image forming apparatus with the image reader is shown in FIG. 1.

A copier 10 which is an embodiment of the image forming apparatus shown in FIG. 1 is equipped with an automatic document feeder 11, a paper feeder 12, an image reader 13 and an image former 14.

The image reader 13 includes a transparent member (contact glass) 15 on which a document may be placed on an illumination area, and an image capturing optical system capable of collecting a part of scattered reflected light from a document surface of the document and obtaining a linear image in the main scanning direction.

The automatic document feeder 11 conveys a document placed on a document tray 28 onto the contact glass 15 with a separator 17 formed of various rollers such as a paper feed roller and a separation roller. The automatic document feeder 11 further conveys the document which has been read from the contact glass 15 as a transparent member with a conveyance belt 18, and discharges the document on a paper discharge tray 20 with a paper discharger 19 formed of various paper discharge rollers.

In case both sides of the document are to be read, a switch-back mechanism in the paper discharger 19 and the conveyance belt 18 return the document back to the contact glass 15 to allow the unread surface be read.

The paper feeding device 12 includes a plurality of paper feed cassettes 21a and 21b containing recording papers as recording media having different sizes, and a paper feeder 22 formed of various rollers conveying the recording papers contained in the paper feed cassettes 21a and 21b, at least one by one, to a transfer position for receiving a transfer image.

The image reader 13 drives a first carriage 35 and a second carriage 36 in a crosswise (sub-scanning) direction in FIG. 1, and irradiates a document surface with light from a light source to read the document surface. The light used for reading the document surface is reflected with a mirror, and then captured at the image reader 13 as a reading signal. More specifically, a lens unit 37 focuses the light toward an image capturing element 57, which is an image reading sensor such as CCD, to form an image thereon to output the reading signal.

The image former 14 includes a light exposing device 23 capable of generating a writing signal based on the reading signal output by the image reader 13, a plurality of photoreceptor drums 24 having the surfaces of which the writing signals formed by the light exposing device 23 are formed, a plurality of image developer 25 filled with toners having different colors, i.e., cyan, magenta, yellow and black, to supply a different color toner to each of the photoreceptor drums 24 to visualize an image according to the writing signal, a transfer belt 26 capable of transferring a color image which is an overlapped image of the visualized images formed on the photoreceptor drums 24 onto a recording paper fed from the paper feeding device 12, and a fixer 27 capable of fixing the color image on the recording paper.

The image reader 13 includes the light irradiator of the embodiment of the present invention, a transparent member capable of holding a document placed on the illumination area, an image capturing optical system capable of focusing a part of scattered reflected light from the document surface to obtain a linear image in a main scanning direction, and a structural body holding the light irradiator and the image capturing optical system.

Specifically, as shown in FIG. 2, the image reader 13 includes the contact glass 15, a body frame 31, the first carriage 35, the second carriage 36, the lens unit 37, the image capturing element 57, and other elements such as a drive rail, a pulley, a motor, a wire and a structural unit holding the drive rail, the pulley, the motor, and the wire.

The first carriage 35 includes a light irradiation optical system including: a light source 43, a light guide 41 and a substrate 51; and a reflection mirror 44a. In the embodiment, the light source 43 is an LED and the substrate 51 is an LED base mounting an LED.

The second carriage 36 includes two reflection mirrors 44b and 44c.

Each of the components forming the light irradiation optical system, i.e. the light source 43, the substrate 51 and the light guide 41; each of the reflection mirrors 44a, 44b and 44c; and the image capturing element 57 have long shapes in a main scanning direction (a direction perpendicular to a paper surface in FIG. 2; a longitudinal direction of the illumination area) or formed of plural members arranged side by side in the main scanning direction.

A document to be read is held on the contact glass 15.

The light irradiation optical system irradiates the surface of the document in the main scanning direction. The reflected light from the illumination area is reflected by respective reflection mirrors and enters the lens unit 37, to be focused on the image capturing element 57 to form an image thereon, that is, linear image data.

The light irradiation optical system sequentially obtains the linear image data while moving the carriage 35 in a sub-scanning direction perpendicular to the main scanning direction to obtain surface image data.

In the image reader 13, the first carriage 35 travels to obtain image data. The second carriage 36 travels such that distances among the document surface, the lens unit 37 and the image capturing element 57 do not vary to obtain good surface image data without defects such as blurs in the image data obtained by the image capturing element 57.

Figure 3:
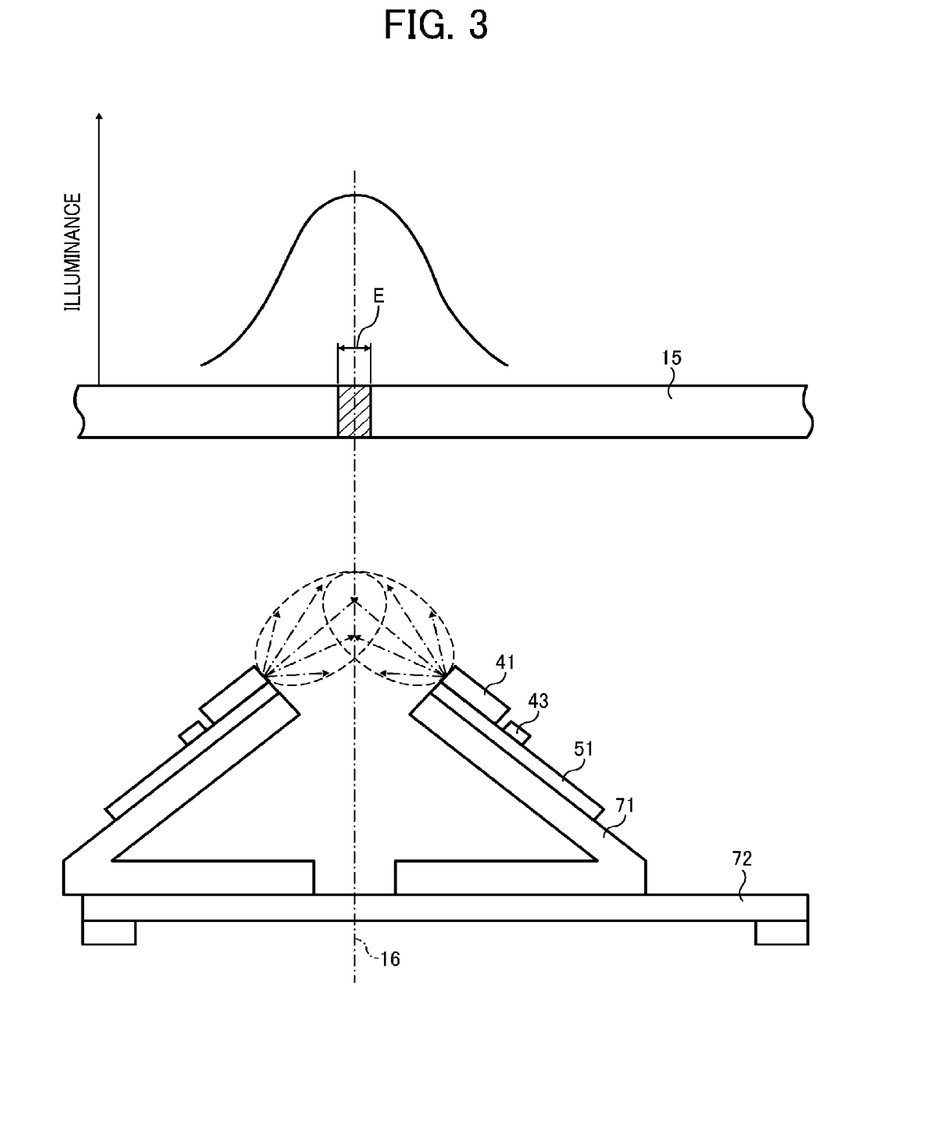
FIG. 3 is a schematic view illustrating an embodiment of the double-light irradiation optical system in relation to an illuminance of the optical system.
Figure 4:
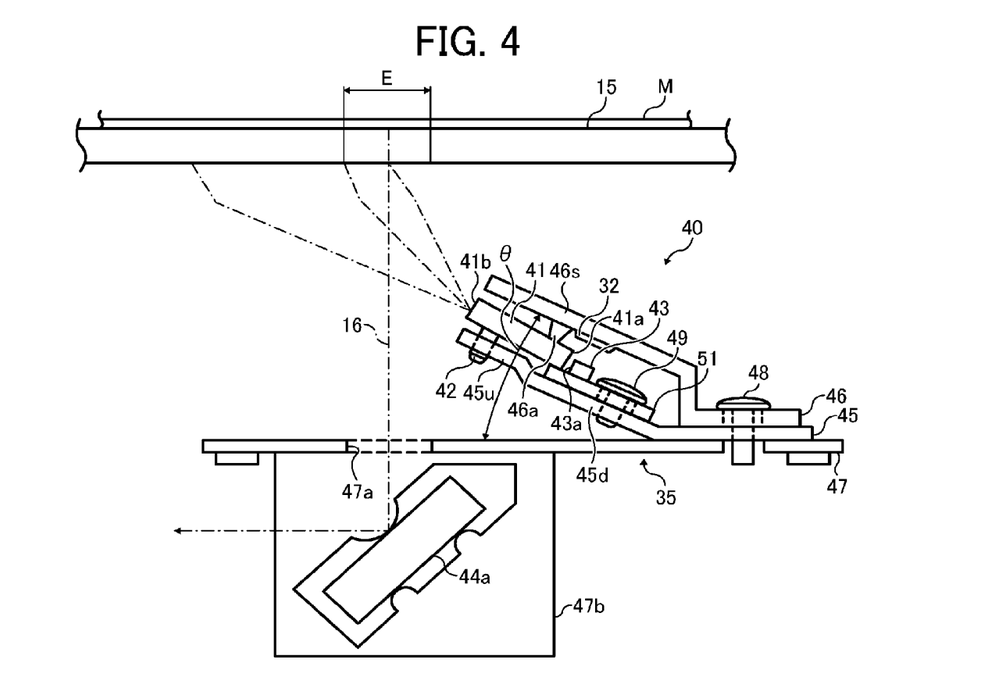
FIG. 4 is a schematic view illustrating a configuration of a part of the light irradiation optical system of the light irradiator.

An embodiment of the double light irradiator is shown in FIGS. 3 and 4.

In FIG. 3, two light irradiation units are disposed so as to be symmetrical about a reading optical axis (light axis of image capturing optical system) 16. FIG. 4 shows only one of the light irradiation units.

As shown in FIG. 3, a bracket 71 having a V-shaped cross section is attached to a first scanner 72.

Preferably, the light source 43 is inclined due to the bracket 71 so as to irradiate only a reading area of a document. This obtains good illuminance distribution in a sub-scanning direction on the document surface.

However, referring to an illuminance distribution shown above in FIG. 3, light is actually irradiated to other areas besides the illumination area E. In such case, for example, when an image having a black solid part surrounded by a white part is read, the light reflected on the white part corresponding to the illuminated area E enters the image capturing element. This increases an output value of the black solid part, such that that black solid part may not faithfully be reproduced.

FIG. 4 is an enlarged view illustrating vicinity of the first carriage 35. The first carriage 35 includes a plate-shaped base 47 formed of a metal plate and a pair of side plates 47b partially attached to the base 47 while hanging down from the base 47. A first mirror 44a is attached between the pair of side plates 47b.

In addition, a light irradiation unit 40 as the light irradiator is attached to the base 47. The light irradiation unit 40 includes a receptacle table 45, the light source 43, the substrate 51, the light guide41 and a cover 46 as a covering member. Further, the receptacle table 45 of the light irradiation unit 40 includes an attaching portion having an attaching surface to the base 47 and an inclined portion folded to have a predetermined angle therewith.

Steps are formed on the inclined portion of the receptacle table 45 in the sub-scanning direction, and an interval between a lower step 45d and the cover 46 is larger than an interval between an upper step 45u and the cover 46. The upper step 45u is almost parallel with the lower step 45d.

The light guide41 is secured on the upper step 45u of the receptacle table 45. The light guide41 has a flat, substantially rectangular shape in the main scanning direction. In this case, three positioning pins 42 (convexities) formed integrally with the light guide41 are inserted into three pin holes perforating the receptacle table 45 to position the light guide41. The three positioning pins 42 are formed at three points (center and both ends in a longitudinal direction) on the bottom surface of the light guide 41.

The substrate 51 which is a flat circuit board is attached to the lower step 45d of the receptacle table 45 with a screw 49. In this example, the screw 49 secures the receptacle table 45 and the cover 46.

The substrate 51 is an LED array substrate on which a plurality of the light sources (side view LEDs as light emitting elements) are attached along the main scanning direction. The substrate 51 drives to irradiate light from an emission surface 41b of the light source 43 to an incident surface 41a of the light guide 41. Further, light is uniformly irradiated to the contact glass 15 from the emission surface 41b of the light guide 41 using a total reflection therein. The cover 46 is formed of an attaching portion that a hole for screw fastening is drilled through to be attached to the base 47 and an inclined portion 46s having a predetermined angle θ with the base 47.

Figure 5:
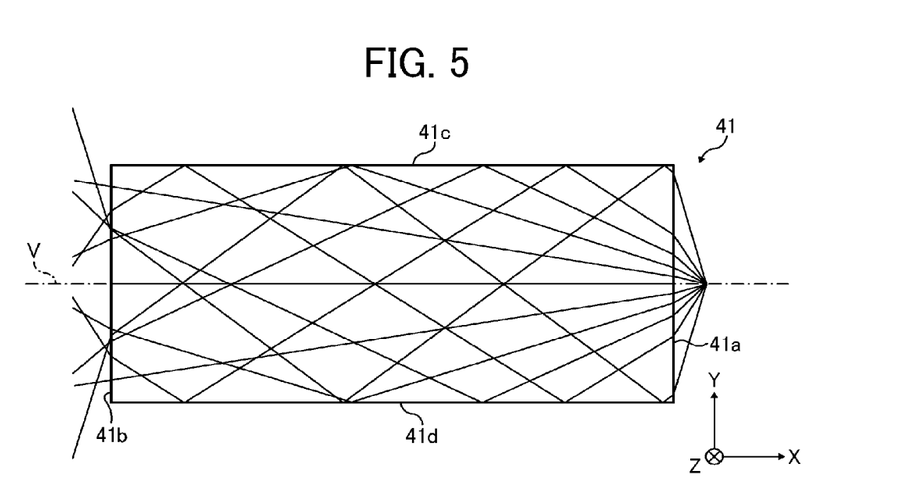
FIG. 5 is a schematic view illustrating an example of a light guide of a light irradiator in the background art.

An example of a conventional light guide constituting a light irradiator is explained, referring to FIG. 5.

FIG. 5 shows a shape of the light guide 41 and light beam passing therethrough.

As for the rectangular light guide41 shown in FIG. 5, an absolute value of an incident angle to the incident surface 41a is identical with an absolute value of an emission angle of the emission surface 41b even when a light beam is reflected many times except for an influence of a diffusion structure formed on the incident surface 41a or the emission surface 41b. Light emission properties of the light source LED are similar to irradiation properties from the emission surface 41b.

Figure 8:
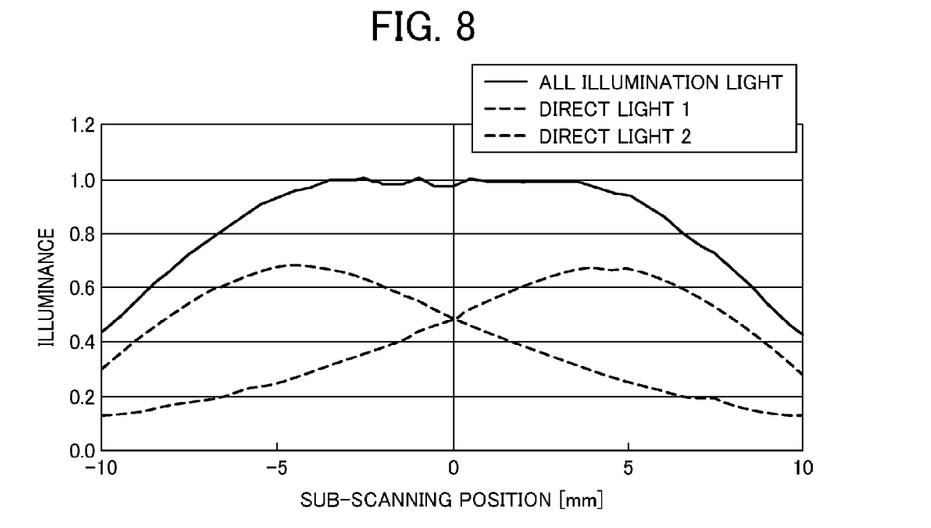
FIG. 8 is a graph showing an illuminance distribution of a document surface for the light irradiator in the background art.

FIG. 8 is a graph showing an illuminance distribution of the double light irradiator equipped with the rectangular light guide41 in FIG. 5.

An illuminance distribution by irradiation from one light irradiation unit is represented by a dotted line "direct light 1", an illuminance distribution by irradiation from the other irradiation unit is resented by another dotted line of "direct light 2", and a synthesized illuminance distribution by irradiation from both of the light irradiation units is presented by a solid line "all illumination light".

As shown in the diagram in FIG. 8, light emitted from one light irradiation unit is most strongly irradiated around ±5 mm. Since an optical axis of the image capturing optical system is located at 0 mm, as long as about ±2 mm region has a substantially constant illuminance, it should be sufficient even in consideration of influences of uneven assembly and oscillation when the carriage is activated. Namely, light is wasted a lot.

If the position to be irradiated is made closer to the optical axis (0 mm), the light use efficiency improves. However, there is a problem that a captured image tends to deteriorate due to direct reflecting light from the document surface.

Figure 7:
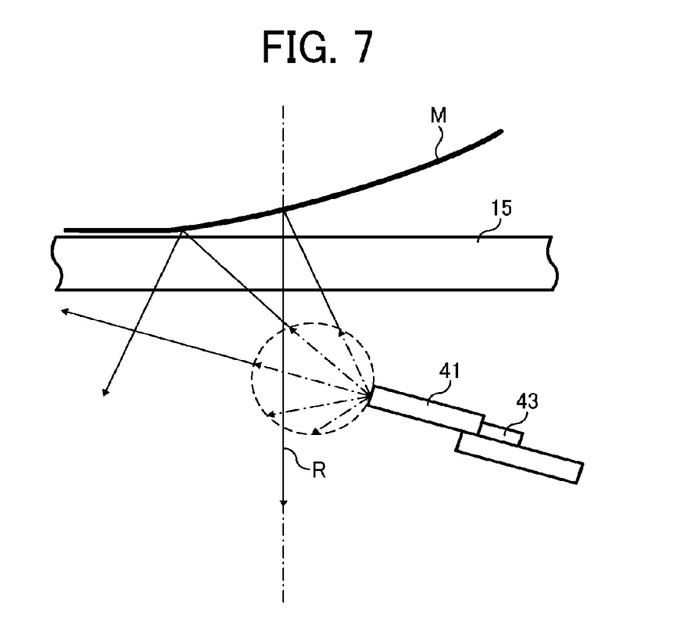
FIG. 7 is a schematic view illustrating deterioration of a captured image captured by the light irradiator in the background art.

The direct reflecting light reflected on the document surface reaches the image capturing optical system when e.g., as shown in FIG. 7, the documents floats, resulting in inclination of the reading surface of the document M.

The image reader installed in the image forming apparatus is designed to focus relatively feeble light diffused and reflected on the document surface and capture an image. Therefore, when the image reader focuses strong light such as direct reflecting light R, image deterioration such as white spots, smear, ghost or flare occasionally occurs. To prevent such phenomena, there is a method of locating the light irradiator apart from the (reading) optical axis 16 of the image capturing optical system. For example, at a position 12 mm below the document surface, the edge of the emission surface 41b of the light guide41 in the light irradiator is preferably located apart from the reading optical axis 16 by 6 mm or more.

Figure 6:
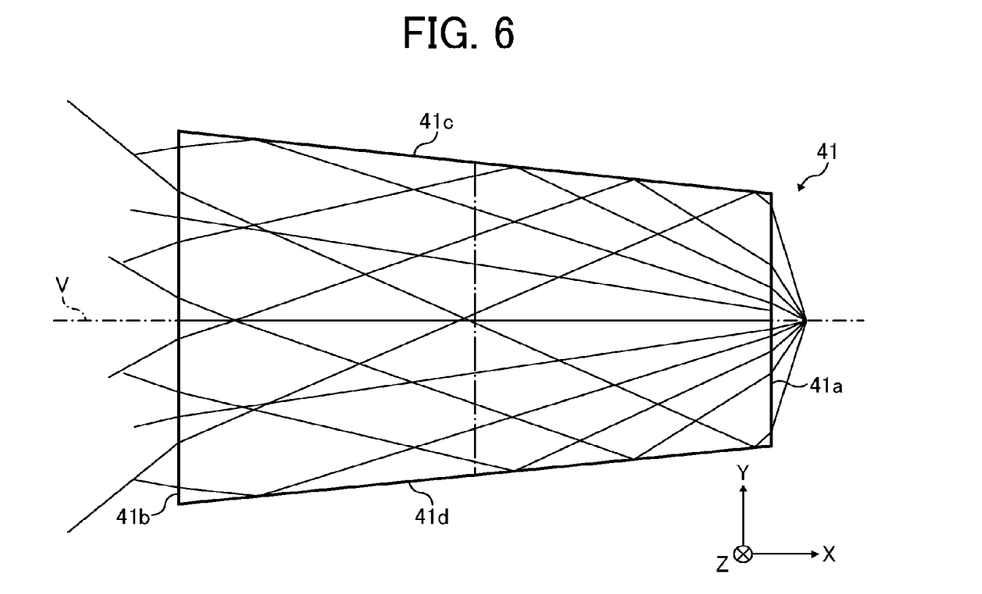
FIG. 6 is a schematic view illustrating another example of a light guide of a light irradiator in the background art.

As shown in FIG. 6, when the light guide41 has a larger cross-sectional area toward the emission surface 41b, light curves to the front of the light guide every time when the light reflects on side surfaces 41c and 41d of the light guide. As a result, more light beams irradiate in a vertical direction from the emission surface 41b of the light guide 41 than those from the light source LED.

Unlike the one light irradiation optical system that distributes light to an opposite reflector, all light beams of the double light irradiation optical system irradiate the document surface. The light guide41 having a shape as illustrated in FIG. 6 can increase light quantity irradiated to a target area.

For example, the light guide 41 in FIG. 6 has a document surface irradiation efficiency higher than that of the rectangular light guide 41 in FIG. 5 by about 24%.

Figure 9:
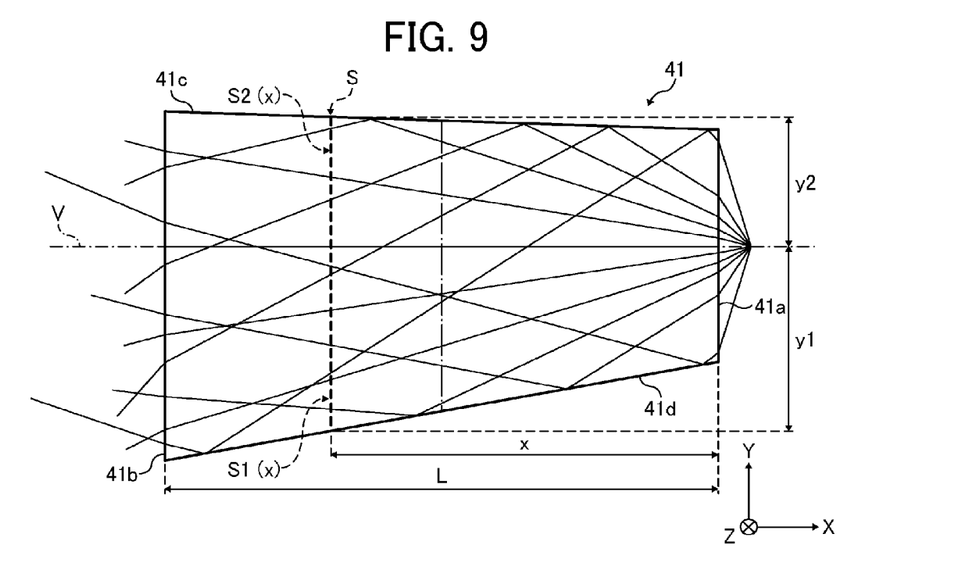
FIG. 9 is a schematic view illustrating an example of a light guide in an embodiment of the light irradiator of the present invention.
Figure 15:
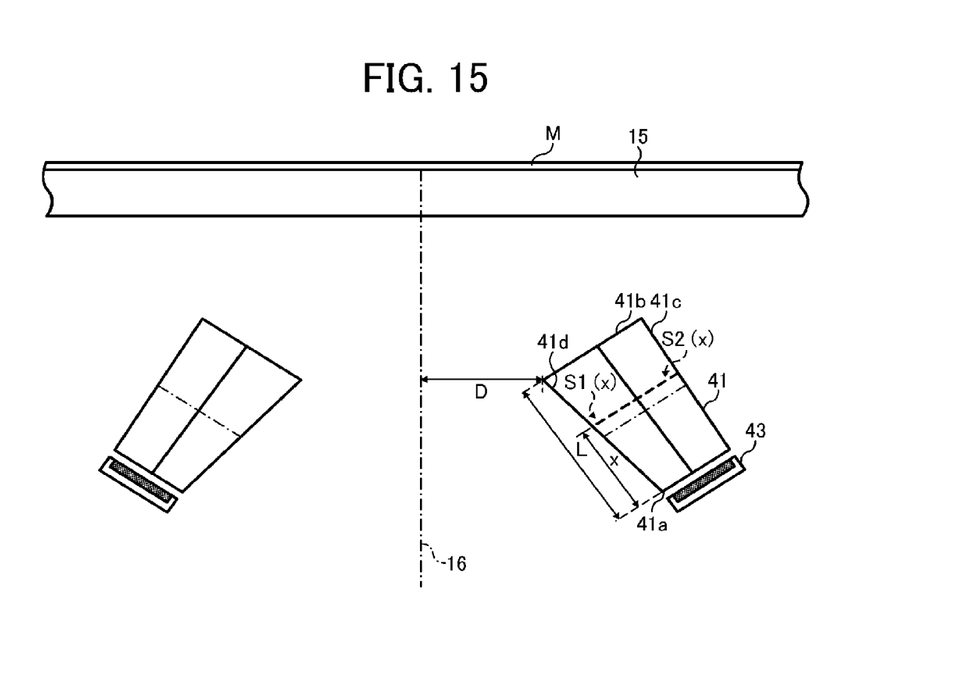
FIG. 15 is a schematic view illustrating an example of a part of a configuration of an embodiment of the light irradiator.

An embodiment of the light irradiator of the present invention is shown in FIG. 15, and an example of the light guide41 constituting the light irradiator is shown in FIG. 9.

As shown in FIG. 15, the embodiment of the light irradiator of the present invention include the light source 43 and the light guide41 guiding a light flux from the light source 43 to an illumination area. The illumination area has a length and a width that allows the light irradiator to sufficiently read a document surface, and the length direction is a main scanning direction and the width direction is a sub-scanning direction.

The light guide41 has a long shape in the main scanning direction and has almost the same cross-sectional shape throughout the main scanning direction, and has an incident surface 41a almost confronting a light emitting surface of the light source 43, an emission surface 41b opposite to the incident surface to emit light to the illumination area, and two side surfaces 41c and 41d reflecting light from the incident surface to the emission surface. The emission surface 41b is disposed apart from the reading optical axis 16 perpendicular to a reading position of the document surface with an inclination relative to the reading optical axis 16.

The incident surface 41a is preferably disposed almost perpendicularly to an irradiation direction in which the largest illuminance of the light emitted from the light source 43 is obtained.

As shown in FIG. 9, the following relations are satisfied:

$$S1(x) \geq S2(x)$$

$$S1(L) > S2(L)$$

wherein S1 represents a divided cross-sectional area closer to the reading optical axis 16 and S2 represents a divided cross-sectional area far from the reading optical axis 16 when a virtual cross-sectional area S parallel to the incident surface 41a of the light guide 41 is divided by a plane passing the center of the incident surface 41a, defined by a direction perpendicular to the incident surface and the main scanning direction; S (x) represents a virtual cross-sectional area distant from the incident surface of the light guide by x; L is a distance from the incident surface to the emission surface; 0≤x<L; and each of x and L is a distance in a direction perpendicular to the incident surface.

When the virtual cross-section parallel to the incident surface 41a, the light guide 41 has a shape such that an area S of the virtual cross-section enlarges from the incident surface 41a to the emission surface 41b. In addition, a magnification of the divided cross-sectional area S1 near the reading optical axis 16 is larger than that of the divided cross-sectional area S2 far therefrom. With this configuration, a direction of the strongest irradiation light, of the irradiation lights passing the light guide 41, is inclined to the reading optical axis 16 relative to the emission surface 41b from the vertical direction. Thus, the document surface is irradiated at high illuminance even when the light guide 41 is disposed apart from the reading optical axis 16.

That the light guide 41 has almost the same cross-sectional shape in the main scanning direction means it has the same cross-sectional shape, except for deformation due to modification error, at least in an effective range of the main scanning direction.

A dashed line V extending in an X direction of the light guide 41 in FIG. 9 represents a vertical line passing the center of the incident surface 41a As shown in FIG. 9, a lower cross-section of the dashed line V (a divided cross-section at the reading optical axis 16 side when in the apparatus) is enlarged more than an upper cross-section (a divided cross-section at the document surface side when in the apparatus).

In the light guide 41 in FIG. 9, light irradiated from the incident surface 41a tends to irradiate to a lower direction of a Y direction. This is because an inclination of the upper side surface 41c in the Y direction is small and a light beam reflected thereon is emitted from the emission surface 41b to a lower direction of the Y direction at a large angle, and an inclination of the lower side surface 41d in the Y direction is large and a light beam reflected thereon is emitted from the emission surface 41b to an upper direction of the Y direction at relatively a small angle.

In the virtual cross-section parallel to the incident surface distant from the incident surface 41a by x in the direction toward the emission surface 41b, when the light guide 41 has a length z in a Z direction and a height y in the Y direction, an area S1 of a lower cross-section of the dashed line V of the virtual cross-section (a divided cross-section at the reading optical axis 16 side when in the apparatus) is represented by the following formula:

$$S1(x) = z \times y1$$

An area S2 of an upper cross-section of the dashed line V of the virtual cross-section (a divided cross-section at the document surface side when in the apparatus) is represented by the following formula:

$$S2(x) = z \times y2$$

In a range of the distance L from the incident surface 41a to the emission surface 41b, i.e., in a range 0≤x<L, S1 and S2 satisfy the following relation:

$$S1(x) \geq S2(x)$$

$$S1(L) > S2(L)$$

The light guide 41 in FIG. 9 is disposed so as to incline relative to the reading optical axis 16 such that the side surface 41d is at the reading optical axis 16 side. This can increase light quantity irradiated to a reading position, thus improving light use efficiency, even when the light guide 41 is located apart from the reading optical axis 16.

Figure 10:
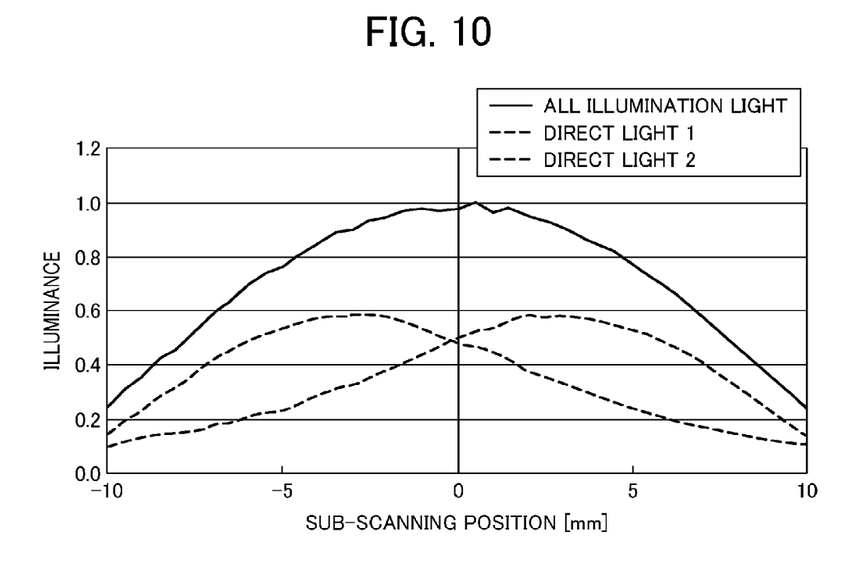
FIG. 10 is a graph showing an illuminance distribution of a document surface for a light irradiator according to an embodiment of the present invention.

FIG. 10 is a graph showing an illuminance distribution of the double light irradiator equipped with the light guide 41 in FIG. 9.

An illuminance distribution by irradiation from one light irradiation unit is represented by a dotted line of "direct light 1", an illuminance distribution by irradiation from the other irradiation unit is represented by another dotted line of "direct light 2", and a synthesized illuminance distribution by irradiation from both of the light irradiation units is represented by a solid line of "all illumination light".

As shown in the graph of FIG. 10, light emitted from one light irradiation unit is most strongly irradiated around ±2.5 mm. Compared with the graph in FIG. 8 showing a conventional example (the illuminance of the light guide in FIG. 5), a position irradiated at the highest illuminance is close to 0 mm where the reading optical axis is located, and the light use efficiency is improved.

Specifically, the light use efficiency of the light irradiator equipped with the light guide 41 in FIG. 9 improves by about 31% in comparison with that of the light irradiator equipped with the light guide 41 in FIG. 5.

In the embodiment of the light irradiator, it is desirable that the light guide 41 is located so as to have the emission surface 41b inclined relative to the reading optical axis 16 such that the divided cross-sectional area S1 near the reading optical axis 16 and the divided cross-sectional area S2 far therefrom satisfy the following relation:

$$S1(x) \geq S2(x)$$

When the inclination is reversed, a desired light use efficiency is not obtained.

Specifically, when the surface 41c in FIG. 9 is located far from the reading optical axis 16 and the side surface 41d is located near the reading optical axis 16, e.g., when the light guide is located as disclosed in Japanese published unexamined application No. 2012-257143, the light use efficiency is improved only by 5% compared with that of the light irradiator equipped with the light guide 41 in FIG. 5.

Figure 11:
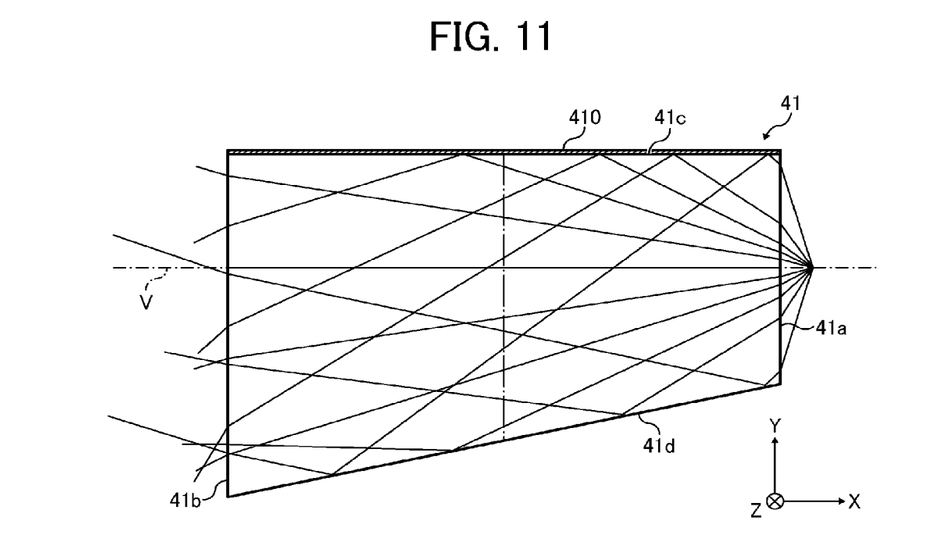
FIG. 11 is a schematic view illustrating an example of a light guide in an embodiment of the light irradiator of the present invention.
Figure 12:
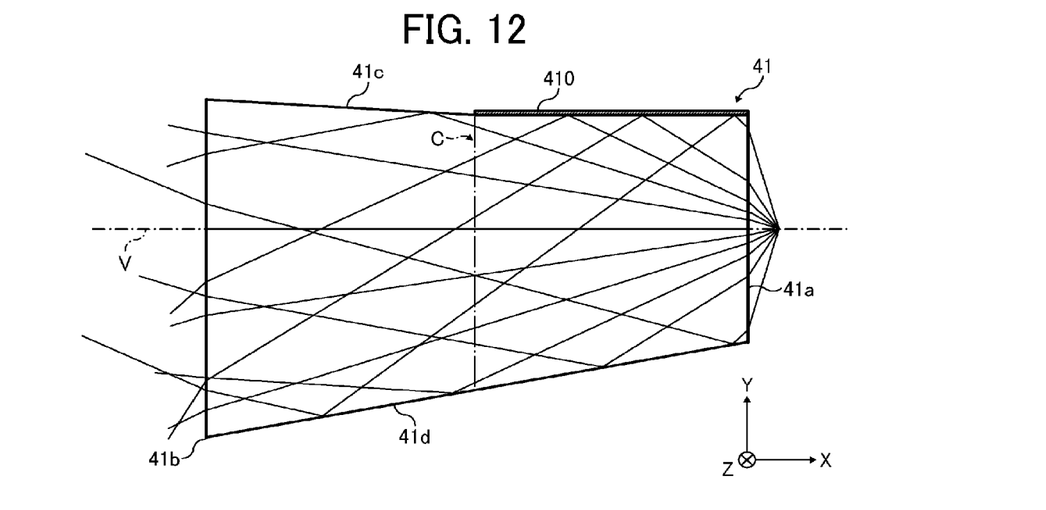
FIG. 12 is a schematic view illustrating a further example of a light guide in an embodiment of the light irradiator of the present invention.
Figure 13:
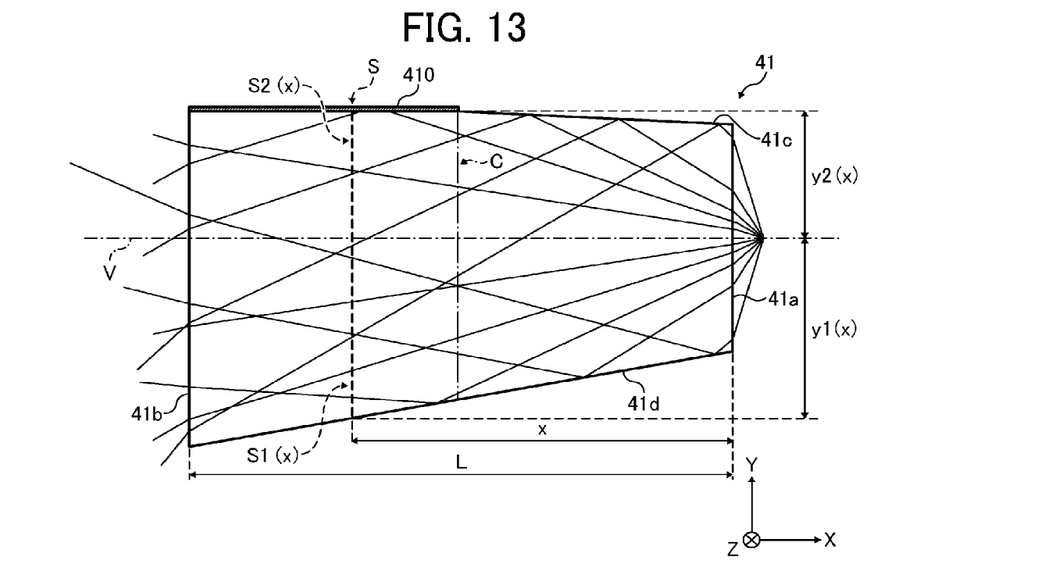
FIG. 13 is a schematic view illustrating another example of a light guide in an embodiment of the light irradiator of the present invention.

Other embodiments of the light guide bodies constituting the light irradiator of the present invention are shown in FIGS. 11 to 13. Each of the light guide bodies 41 in FIGS. 11 to 13 is located with an inclination so as to have the side surface 41*d* below the Y direction near the reading optical axis 16 and the side surface 41*c* above the Y direction far therefrom.

In order to secure the light guide 41 and the light source (LED) 43 at high positional accuracy in the light irradiator, an area 410 perpendicular to the incident surface 41*a* is preferably formed on at least a portion of the side surfaces 41*c* and 41*d*.

In the light guide 41 in FIG. 11, the whole surface of the side surface 41*c* far from the reading optical axis 16 is the area 410 perpendicular to the incident surface 41*a*.

In the light guide41 in FIG. 12, a side closer to the incident surface 41*a* than a center line C in an X direction of the side surface 41*c* far from the reading optical axis 16 is the area 410 perpendicular to the incident surface 41*a*.

In the light guide 41 in FIG. 13, a side closer to the emission surface 41*b* than a center line C in the X direction of the side surface 41*c* far from the reading optical axis 16 is the area 410 perpendicular to the incident surface 41*a*.

Comparison of the light use efficiency between each of the light irradiators equipped with each of the light guide bodies 41 in FIGS. 11 to 13 and the conventional light irradiator equipped with the light guide 41 in FIG. 5 are shown in Table 1.

TABLE 1

| | Light Guide Body | | | |
| --- | --- | --- | --- | --- |
| | FIG. 5 | FIG. 11 | FIG. 12 | FIG. 13 |
| Ratio of Light Use Efficiency relative to the Light guide in FIG. 5 | 1 | 1.27 | 1.29 | 1.33 |

As Table 1 shows, the light use efficiency is mostly improved for the light guide 41 in FIG. 13. Namely, it is preferable to set at least a portion of the side surface 41*c* far from the reading optical axis 16 at the emission surface 41*b* side as the area 410 perpendicular to the incident surface 41*a*.

When the area 410 perpendicular to the incident surface 41*a* is formed on neither of side surfaces of the light guide 41, two components, i.e., a structural unit to be secured at a layout inclination angle of the substrate 51 and a structural unit to be secured at an inclination angle of either of contact surfaces of the light guide 41 are needed. For example, when a sheet-pressed component is used as the structural unit to be fixed, machining error becomes large because it is not easy to bend the component at an arbitrary angle besides the right angle.

When a top view type LED is used as the light source 43, an emission surface of the LED and the incident surface 41*a* of the light guide are located in parallel to make the incident surface 41*a* and the surface of the substrate 51 parallel to each other. When the area 410 perpendicular to the incident surface 41*a* is formed on either of side surfaces of the light guide 41, the area 410 is perpendicular to the surface of the substrate 51 and a sheet-pressed component which is vertically bent can be used to secure the position.

Since the side surface 41*d* near the reading optical axis 16 of the light guide 41 needs to have an inclination angle larger than 90°, the area 410 perpendicular to the incident surface 41*a* is preferably formed on the side surface 41*c* far from the reading optical axis 16, and more preferably at the side of the emission surface 41*b*.

The inclination of the side surface of the light guide 41 is determined by differentiating y1 (x) and y2 (x), i.e., S1 (x) and S2 (x) as shown in FIG. 13 when a Z direction therein has a constant length. To obtain higher light use efficiencies, dS2 (x)/dx is preferably closer to 0 as it is closer to the emission surface 41*b*.

Namely, the divided cross-sectional area S1 near the reading optical axis 16 and the divided cross-sectional area S2 far therefrom preferably satisfy the following relation:

$$dS1(x)dx \neq 0$$

$$dS2(0)/dx \geq dS2(x)/dx \geq dS2(L)/dx \geq 0$$

wherein S (x) represents a virtual cross-sectional area distant from the incident surface of the light guide by x; L is a distance from the incident surface to the emission surface; $0 \leq x < L$; and each of x and L is a distance in a direction perpendicular to the incident surface.

The light guide 41 of the light irradiator of the embodiment in each of FIGS. 9 and 11 to 13 is preferably disposed such that a line perpendicular to the incident surface 41*a* such as a dashed line V has an angle not greater than 45° relative to the reading optical axis 16. When the angle is large, the area irradiated with light expands, resulting in decrease of illuminance.

Figure 14:
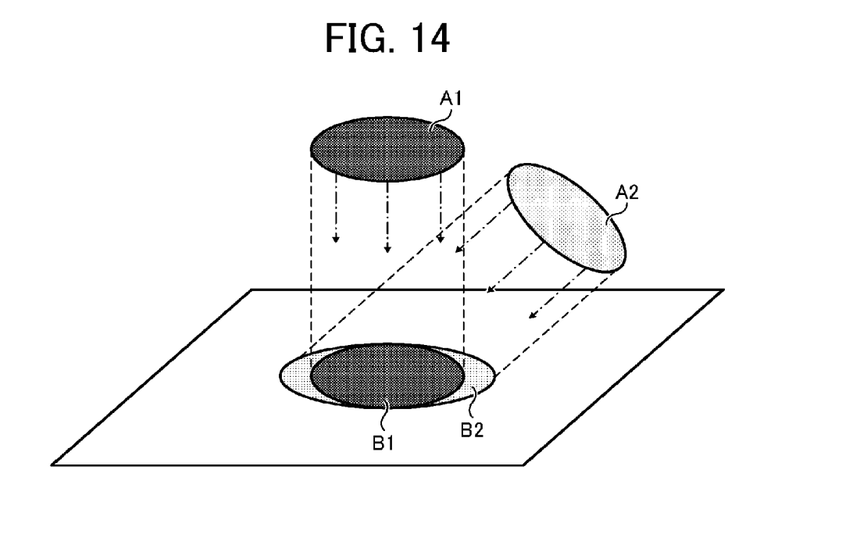
FIG. 14 is a schematic view illustrating properties of illuminance when light diagonally enters.

Properties of illuminance when light is obliquely incident are explained, referring to FIG. 14.

When light is obliquely incident as A2, an irradiated area B2 on an object to be irradiated expands more than an irradiated area B1 when light is perpendicularly incident as A1.

In view of this, an optical simulation of the light irradiator of the embodiment is executed while disposing the light guide 41 such that a line perpendicular to the incident surface 41*a* has an angle of about 33° relative to the reading optical axis 16.

The light guide 41 of the light irradiator of the embodiment in each of FIGS. 9 and 11 to 13 has a shape such that a cross-sectional area parallel to the incident surface 41*a* becomes larger from the incident surface 41*a* to the emission surface 41*b*. The shape is preferably within a rectangle having a longitudinal direction which is an X direction from the incident surface 41*a* to the emission surface 41*b* and a squareness ratio of 1 or less.

This is because an irradiated area on the document surface with light expands when the emission surface 41*b* has too large an area.

At least either of the incident surface 41*a* and the emission surface 41*b* of the light guide 41 has a microstructure capable of diffusing light from the light source 43.

The microstructure (diffusion structure) is applied for the purpose of improving illumination robustness and softening glare.

Typically, when light enters a surface having diffusion structure at an angle closer to perpendicular angle, the surface has higher transmittance. When light enters a diffusion structure formed of microscopic convexities and concavities at an angle besides the perpendicular angle, the diffusion structure varies in transmittance. In order that the diffusion structure has a minimum transmittance loss, the light emitting surface of the light source 43, and the incident surface 41*a* and the emission surface 41*b* of the light guide 41 are preferably parallel to each other.

The light guide 41 is formed of a transparent material. The transparent material is preferably, e.g., a resin material. Further, the light guide 41 formed of the resin material is preferably formed by, e.g., injection molding.

When the light guide 41 is formed by injection molding with a resin, a lightweight light guide can be prepared at low cost even if it has a complicated shape. Therefore, the light irradiator equipped with such light guide 41 is inexpensive and light in weight.

Having now fully described the invention, it will be apparent to one of ordinary skill in the art that many changes and modifications can be made thereto without departing from the spirit and scope of the invention as set forth therein.

What is claimed is:

1. A light irradiator, comprising:
   a light source; and
   a light guide to guide a light flux from the light source to an illumination area,
   wherein the illumination area has a length and a width, a longitudinal direction of the light guide being a main scanning direction and a width direction of the light guide being a sub-scanning direction,
   the light guide has a long shape in the main scanning direction with substantially the same cross-sectional shape throughout the main scanning direction, and includes an incident surface almost confronting a light emitting surface of the light source an emission surface opposite to the incident surface to emit light to the illumination area, and two side surfaces reflecting light from the incident surface to the emission surface,
   the emission surface is disposed apart from a reading optical axis perpendicular to a reading position of a document surface with an inclination relative to the reading optical axis, and
   the following relations are satisfied:

$$S1(x) \geq S2(x)$$

$$S1(L) > S2(L)$$

wherein S1 represents a divided cross-sectional area near the reading optical axis and S2 represents a divided cross-sectional area far from the reading optical axis when a virtual cross-sectional area S parallel to the incident surface of the light guide is divided by a plane passing a center of the incident surface and defined by a direction perpendicular to the incident surface and the main scanning direction; S (x) represents a virtual cross-sectional area distant from the incident surface of the light guide by x; L is a distance from the incident surface to the emission surface; $0 \leq x < L$; and each of x and L is a distance in a direction perpendicular to the incident surface.

2. The light irradiator of claim 1, wherein the light source is one of a plurality of light emitting elements arranged in the main scanning direction.

3. The light irradiator of claim 1, wherein the light source is a light emitting body that is long in the main scanning direction.

4. The light irradiator of claim 1, wherein the divided cross-sectional area S1 near the reading optical axis and the divided cross-sectional area S2 far from the reading optical axis satisfy the following relation:

$$dS1(x)/dx \neq 0$$

$$dS2(0)/dx \geq dS2(x)/dx \geq dS2(L)/dx \geq 0$$

wherein S (x) represents a virtual cross-sectional area distant from the incident surface of the light guide by x; L is a distance from the incident surface to the emission surface; $0 \leq x < L$; and each of x and L is a distance in a direction perpendicular to the incident surface.

5. The light irradiator of claim 1, wherein the light guide includes at least a portion of a side surface at the emission surface side that is far from the reading optical axis and that is perpendicular to the incident surface of the light guide.

6. The light irradiator of claim 1, wherein at least one of the incident surface and the emission surface of the light guide has a microstructure capable of diffusing light from the light source.

7. The light irradiator of claim 1, wherein the light guide is formed of a transparent resin material.

8. The light irradiator of claim 1, wherein the light guide is formed by injection molding.

9. An image reader, comprising:
   the light irradiator according to claim 1;
   a transparent member to hold a document placed on the illumination area;
   an image capturing optical system to focus a part of scattered reflected light from the document surface to obtain a linear image in the main scanning direction; and
   a structural body to hold the light irradiator and the image capturing optical system.

10. An image forming apparatus, comprising:
    the image reader according to claim 9.

* * * * *